United States Patent [19]

Croft

[11] Patent Number: 4,997,223
[45] Date of Patent: Mar. 5, 1991

[54] COMPACT LATCHING DEVICE FOR SEAT ASSEMBLIES

[75] Inventor: George Croft, Oakville, Canada

[73] Assignee: Canadian A.S.E. Limited, Mississauga, Canada

[21] Appl. No.: 453,890

[22] Filed: Dec. 20, 1989

[30] Foreign Application Priority Data

Dec. 28, 1988 [CA] Canada .................. 587171

[51] Int. Cl.$^5$ .................................................. A47C 1/00
[52] U.S. Cl. ............................................. 297/367; 297/379
[58] Field of Search ................ 297/567, 366, 368, 379

[56] References Cited

U.S. PATENT DOCUMENTS

| | | | |
|---|---|---|---|
| 3,737,946 | 6/1973 | Giuliani | 297/367 X |
| 4,082,352 | 4/1978 | Bales et al. | 297/367 X |
| 4,087,885 | 5/1978 | Gillentine | 297/367 X |
| 4,103,970 | 8/1978 | Homier | 297/367 X |
| 4,348,050 | 9/1982 | Letournoux et al. | 297/367 X |
| 4,384,744 | 5/1983 | Barley | 297/367 |
| 4,770,464 | 9/1988 | Pipon et al. | 297/367 |
| 4,874,205 | 10/1989 | Arefinejad et al. | 297/367 X |

FOREIGN PATENT DOCUMENTS

1187870 4/1970 United Kingdom ................ 297/366

Primary Examiner—Jose V. Chen
Attorney, Agent, or Firm—Patrick J. Hofbauer

[57] ABSTRACT

A compact latching device for use with a vehicle seat assembly suitable for use in applications presenting a small design envelope, wherein one or more pawls are mounted on a seat-cushion member within an arcuate gear sector mounted on the other of the seat members so as to be simultaneously and selectively movable into and out of locking engagement with the gear sector so as to restrain pivotal folding of the backrest member relative to the seat-cushion member when secured in locking engagement, and so as to allow for pivotal folding of the backrest member relative to the seat-cushion member when removed out of locking engagement.

10 Claims, 5 Drawing Sheets

COMPACT LATCHING DEVICE FOR SEAT ASSEMBLIES

This invention relates to a latching device for use with foldable vehicle seat assemblies, more particularly, to seat assemblies adapted to be folded from a normal upright configuration adapted to accommodate one or more passengers to a forwardly folded configuration and is particularly suited for application to more confined areas, such as, for example, in compact vehicles.

Automotive seat assemblies having a backrest member foldable over a seat-cushion member are well known. It is common with such seat assemblies to provide a latching device interconnected between the backrest member and the seat-cushion member of the seat assembly to control the angle of inclination of the backrest member relative to the seat-cushion member. In applications where access is frequently required to space behind the seat assembly, for example, to allow ingress and egress of passengers to the rear passenger compartment in two door vehicles, or, for example, to allow access to space behind the two seats of a sports-car type vehicle, it is desirable to have a fast acting so-called "dumping" mechanism incorporated into the latching mechanism. Such a dumping mechanism allows the latching device to be quickly released so that the backrest member can be quickly folded from the normal upright passenger carrying orientation to a forwardly folded configuration wherein the front surface of the backrest member rests against or adjacent to the seat-cushion member. In this forwardly folded configuration, access is easily had to the space behind the vehicle seat assembly.

It is well known in the art to combine such a "dumping" feature together with a "reclining" feature in a single latching device such that, at the operator's selection, the backrest member can be quickly "dumped" as previously mentioned or, alternatively, such that, the inclination angle of the backrest member to the seat-cushion member can be gradually and controllably adjusted through a relatively narrow range of inclination angles, so as to suit the particular posture preferences of a passenger occupying the vehicle seat assembly.

In recent years, considerably more attention has been paid by vehicle manufacturers to the seat assemblies installed in automobiles. Accordingly, the latching devices utilized in such seat assemblies have tended to become increasingly large and complex. This is especially so in view of the multiplicity of adjustment functions that are currently being combined in a single latching device for a particular vehicle application. This has tended to create a problem with respect to smaller vehicles, most particularly in relation to compact and sport-type vehicles, wherein the passenger compartments may be of relatively small volume, thus providing for particularly small design envelopes for the accommodation of the latching devices.

Of course, some economy of space can be observed by down-sizing known multiple feature latching devices, but such down-sizing is limited due to safety considerations, in view of the extreme stress loading encountered by the latching devices under sudden vehicle deceleration or other crash-like conditions.

Known latching devices combining both the dumping and reclining features described above are of complex design and typically cumbersome to operate. Moreover, they consist of a large multiplicity of parts, such that they are difficult to manufacture and assemble, which results in high production costs. Also, they are large and bulky, precluding their use in limited space applications.

An object of this invention is to provide an improved latching device for foldable seat assemblies of the type described above which is compact, safe, simple to operate and inexpensive to manufacture, and which may be incorporated into the vehicle seat assembly in a manner so as to occupy a minimal volume of space.

A further object of the invention is to provide an improved latching device which has all of the above-noted characteristics, yet which is capable of accommodating both the dumping and reclining functions.

It is yet a further object of the present invention to provide a latching mechanism having all of the above features which may be esthetically incorporated into the seat assembly in a manner such that interference and hazardous exposure of any of the latching elements is minimized and which reduces irritating noise due to rattling of the latch components and the backrest member.

It is yet a further object of the present invention to provide a latching mechanism which, although providing for both the dumping and reclining features of the backrest member, remains simple to use by virtue of the need for manipulation by the operator of but a single lever to control both functions.

It is yet a further object of a preferred embodiment of the present invention to provide a latching mechanism which positively and automatically latches the backrest member in an upright orientation, so as to prevent uncontrolled or unexpected pivoting of the backrest member relative to the seat-cushion member when the backrest member is in the range of inclination adjustment positions defined by the latching device. In this manner, the backrest member cannot be inadvertently or unintentionally left in an unlatched upright configuration, to the detriment of a seat occupant during vehicle operation.

In accordance with one aspect of the invention, there is provided a latching device for use with a vehicle seat assembly having a first and second seat member pivotally foldable relative to one another about a pivot axis between a folded and an unfolded operative position, which device comprises a gear means rigidly affixed to the first of said members so as to define a first inturned arc whose notional axis is generally parallel to the aforesaid pivot axis. A cam means is journalled for rotation in the second seat member about a rotational axis arranged in generally parallel relation to the pivot axis and within the first inturned arc defined by the gear means. A pawl actuator means having first and second end portions is pivotally mounted adjacent its first end portion on the second member, also within the first inturned arc. The pawl actuator means is adapted to interact with the cam means on a controlled rotation of the cam means to selectively move the pawl actuator means between first and second limit positions. A rotational control means is affixed to the cam means for effecting said controlled rotation thereof between a first and a second rotational orientation. A pawl means is mounted on the pawl actuator means intermediate the first and second end portions of the pawl actuator means for movement therewith. With this arrangement, rotation of the cam means to the first rotational orientation causes the pawl actuator means to move to the first limit position, at which position the pawl means lockingly engages the gear means so as to restrain the pivotal folding of the first seat member relative to the second seat member. Moreover, with this arrangement, rotation of the cam means to the second rotational orientation causes the pawl actuator means to move to the second limit position, at which position the pawl means is disengaged from the gear means so as to allow for pivotal folding of the first seat member relative to the second seat member.

In accordance with another preferred aspect of the invention, there is provided a vehicle seat assembly having a backrest member and a seat-cushion member pivotally foldable relative to one another about a pivot axis between a folded and an unfolded operative position, the device comprising a gear means comprised of two circumferentially spaced gear sectors rigidly affixed to the backrest member so as to together define a first inturned arc whose notional axis is generally parallel to the pivot axis. A cam means is is journalled for rotation in the seat-cushion member about a rotational axis arranged in generally parallel relation to the pivot axis and within the first inturned arc. Two substantially congruent pawl actuator members, each having first and second end portions are each pivotally mounted adjacent their respective first end portions on the seat-cushion member, internal to the first inturned arc. Each of the pawl actuator members is adapted to interact with the cam means upon controlled rotation of the cam means to selectively and simultaneously move the pawl actuator members between the first and second limit positions. A rotational control means is affixed to the cam means for effecting such controlled rotation between a first and a second rotational orientation. A pawl means is mounted on each pawl actuator member intermediate the respective first and second ends of the pawl actuator member for movement therewith. With this arrangement, rotation of the cam means to the firs rotational orientation causes the pawl actuator members to simultaneously move to their respective first limit positions, at which positions each respective pawl means lockingly engages a respective gear sector so as to restrain pivotal folding of the backrest member relative to the seat-cushion member. Moreover, with this arrangement, rotation of the cam means to the second rotational orientation causes the pawl actuator members to simultaneously move to their respective second limit positions, whereat the pawl means are disengaged from the respective gear sectors, so as to allow for pivotal folding of the seatback member relative to the seat cushion member.

The rotational control means preferably includes spring means for biasing the cam means towards the first rotational orientation, the notional axis of the first defined arc is coincident with the rotational axis of the cam means and the notional axis of the first defined arc is also coincident with the pivot axis of the backrest member and the seat-cushion member.

Figures 1, 2:
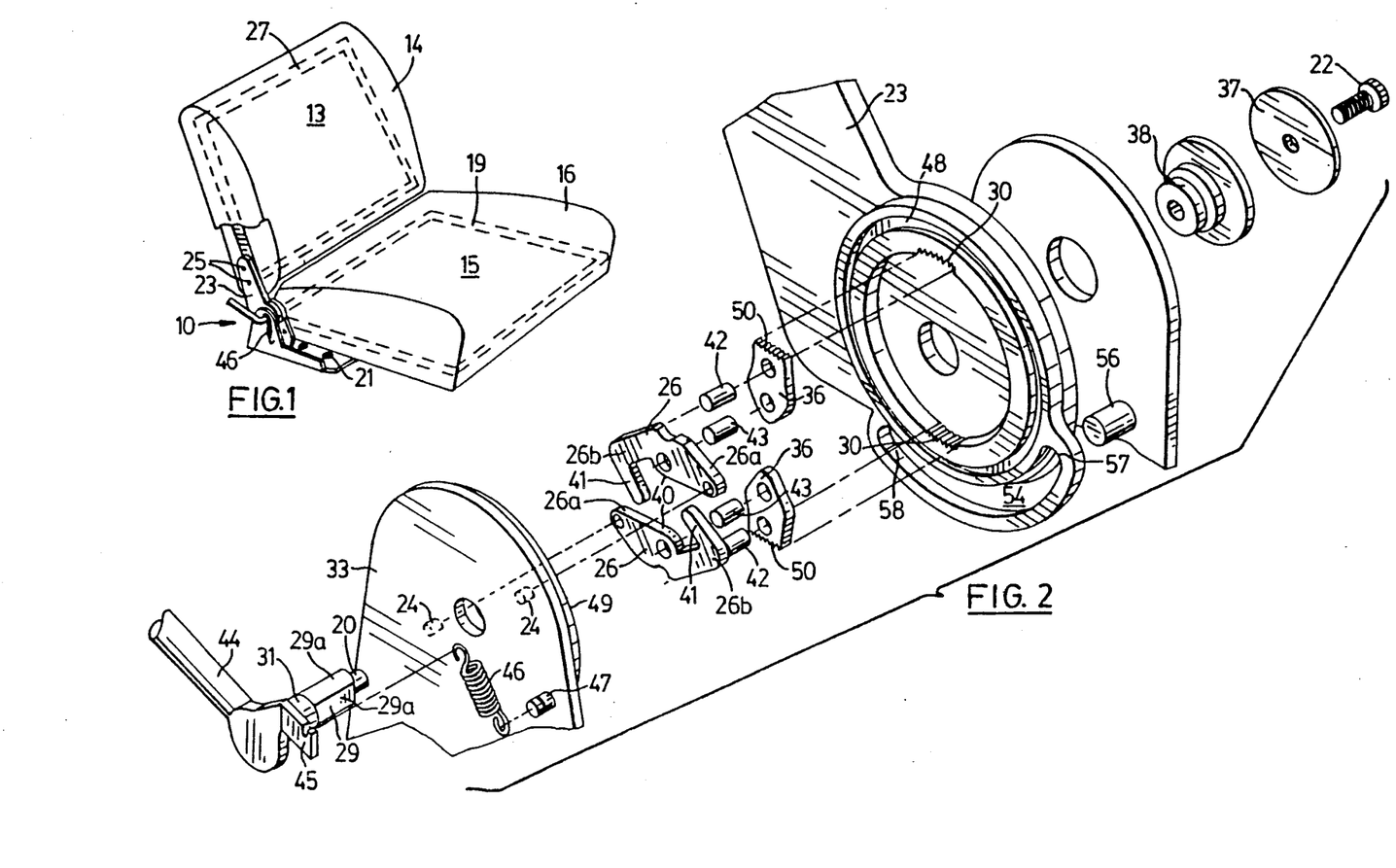
FIG. 1 is a schematic isometric projection of a foldable vehicle seat assembly to which the invention has been adapted.
FIG. 2 is an exploded view of a preferred embodiment of latching device according to the invention.

These and other features of the invention will be more fully understood with reference to a preferred embodiment of latching device according to the invention, as described below, by way of example, and with reference to the accompanying drawing which:

FIG. 1 shows a typical vehicle seat assembly 12 of the general type with which the invention may be used. A latching device according to the invention is shown diagramatically, for purposes of general orientation only, in FIG. 1, encircled by dotted line 2.

The vehicle seat assembly may be of the "bucket" type illustrated or may be of the well-known, multi-occupant "bench" type (not shown). In the latter case, it may be preferable to use one latching device according to the invention at each of the two sides of the "bench" type seat assembly in order to provide a requisite degree of rigidity to the seat assembly. In this latter instance, it is desirable to utilize a slave connecting rod to join the two latching assemblies so that an activation means need only be provided on one side of the "bench" type seat assembly, for example on the driver's side With "bucket" type seat assemblies, it is generally sufficient to use a single latching device for each seat assembly installed, as shown in FIG. 1. The preferred embodiment will be described below with reference to such single use, although it will be expressly understood by those skilled in the art that specific vehicle applications may call for the analogous use of two or more latching devices with each vehicle seat assembly.

Figure 6:
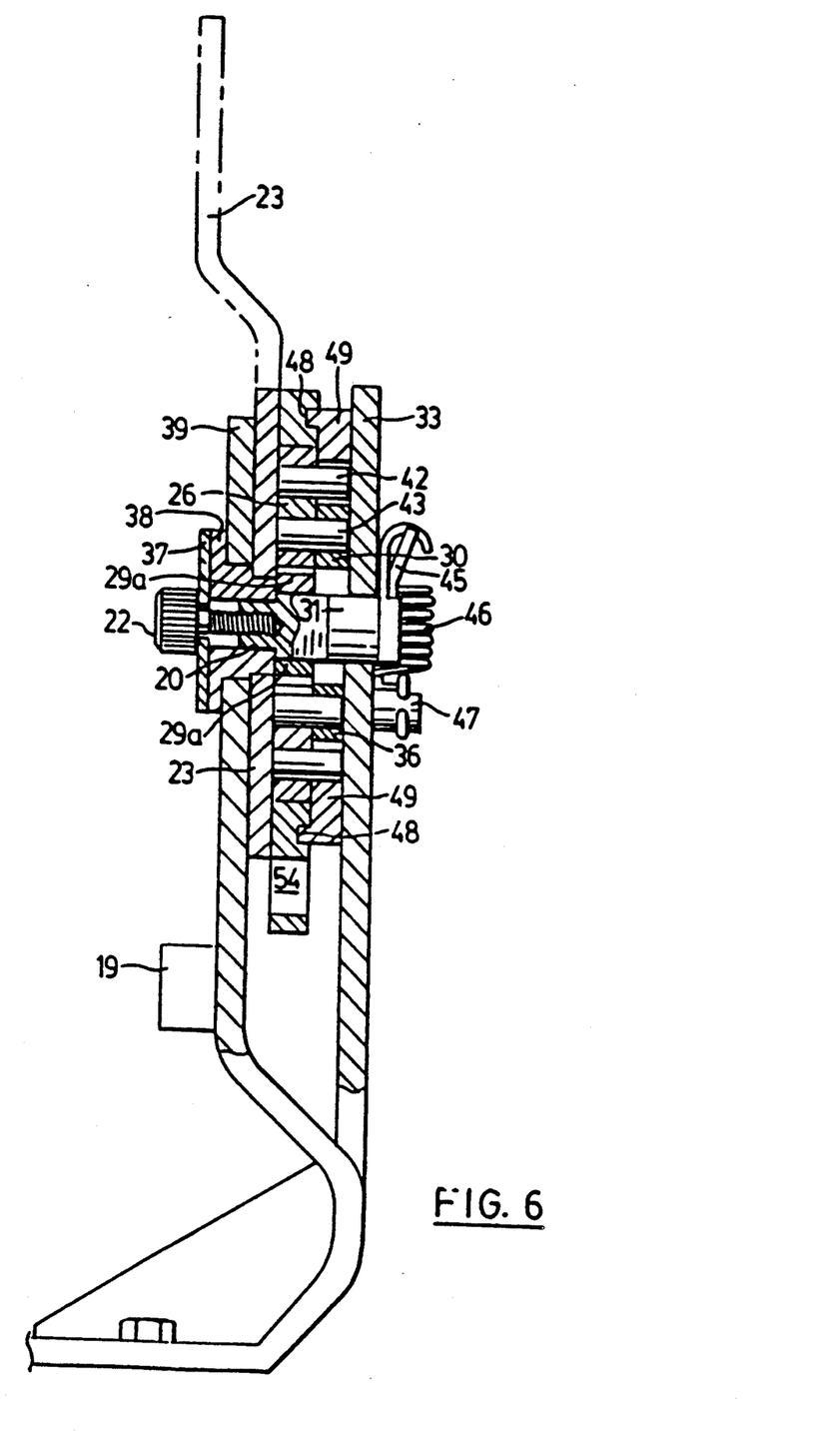

The vehicle seat assembly of the Figures has a first seat member 14, hereinafter referred to as the "backrest member", which is pivotally foldable over a second seat member 16, hereinafter referred to as the "seat-cushion member", about a pivot axis arranged in generally parallel relation to a trailing edge of the seat-cushion member 16. The seat-cushion member 16 is of any conventional design and typically encloses a seat support frame 19 which is covered in a customary manner with upholstery materials 15. The latching device 10 is rigidly affixed to the support frame 19 by bolts or other affixation means (not shown) as best seen in FIG. 6, or may be integrally formed therewith. The support frame 19 is conventionally anchored to the floor panels (not shown) of the vehicle by means of bolts 21 (see FIG. 6), although it is desirable to interpose an adjustable, longitudinal slide mechanism (not shown) between the support frame 19 and the floor panels (not shown). The backrest member 14 is also of any conventional design and comprises a support frame 27 which is covered in the usual manner with upholstery materials 13.

A hinge plate 23 is rigidly affixed Lo the backrest support frame 27 by bolts 25 or other fastening means, which fastening means pass through the hinge plate 23 and support frame 27. It will be appreciated that the hinge plate 23 may, in place of the arrangement shown, be integrally formed with the support frame 27, or may be attached thereto by welding or any other suitable affixation means. Throughout this description of the preferred embodiment of the invention, it will be apparent to those skilled in the art that additional rivets or other fastenings means not illustrated in the drawings might be desirably added to give additional rigidity to the latching mechanism of the invention. However, the number and placement of such fastening means is a matter of routine design choice, and they have, in some instances, been omitted to simplify the drawings.

The hinge plate 23 has formed on one of its lateral outer surface an angular, generally concave channel 48 which channel 48, in the assembled device 10, mates with a complementary, generally convex annular ridge 49 formed on an outer support plate 33, thereby to together define a coupling means between the backrest 14 and seat-cushion 16 members, which coupling means provides for said pivotal folding of the backrest member 14 relative to the seat-cushion member 16 and defines the pivot axis of such pivotal folding.

A gear means in the preferred form of two circumferentially spaced gear sectors 30, 30, is rigidly affixed to the hinge plate 23 of the backrest member so as to together define a first inturned arc (indicated by dotted line A, see FIGS. 3-5), the notional axis of which first inturned arc A is generally parallel and coincident with the aforementioned pivot axis of the backrest 14 and seat-cushion 16 members.

A cam means, in the form of an enlarged, centrally disposed lobed portion 29 of axle shaft 31 is journalled at one end for rotation in an outer support plate 33 of the device 10. The opposite other end of the axle shaft 31 is formed into a reduced diameter end portion 20, which end portion 20 is journalled for rotation, by means of a bushing 38, in an inside support plate 39, which inner support plate 39 joins the outer support plate 33 below the level of the latching device 10 as best seen in FIG. 6. A washer 37 and a cap screw 22 secure the axle shaft assembly 31 in place, as best seen in FIG. 6, the cap screw 22 being internally threaded into the reduced diameter end portion 20. It Will be appreciated from the Figures that the cam means 29 is in this manner journalled for rotation in the seat-cushion member 16 in generally parallel relation to the pivot axis o the backrest 14 and seat-cushion member 60, within the first inturned arc A.

Two substantially congruent pawl actuator members 26, 26, each having a first 26a and a second 26b end portion, are pivotally mounted by means of respective pivot pins 24, 24 adjacent the respective first end portion 26a on the outer support plate 33 of the seat-cushion member 16, internal to the first inturned arc A.

Each of the pawl actuator members 26 is adapted to interact with a respective lobe 29a, 29a of the cam means 29 upon controlled rotation of the axle shaft 31 (and the attached cam means 29) so as to simultaneously move the pawl actuator members 26, 26 between first and second limit positions defined more fully below. The pawl actuator members 26, 26 are each so adapted to interact with a respective lobe 29a of the cam means 29 by way of a contact portion 40, disposed generally intermediately between the first end portion 26a and the second end portion 26b, and by way of a hooked finger portion 41 which hooks backwardly toward the first end portion 26a. The contact portion 40 and the finger portion 41 together define a gap of measured distance in which gap a lobe 29a of the cam means 29 may reciprocatingly rotate to selectively interact with either of the contact portion 40 or the finger portion 41.

A pawl means 36 is rigidly mounted on each pawl actuator member 26 intermediate the respective first 26a and second 26b end portions of the pawl actuator member 26 for movement therewith into and out of restraining engagement with a respective one of the gear sectors 30, 30, as more fully described below. The pawl means 36, as shown, are mounted on each respective pawl actuator member 26 by paired rivets 42 and 43.

Figure 3:
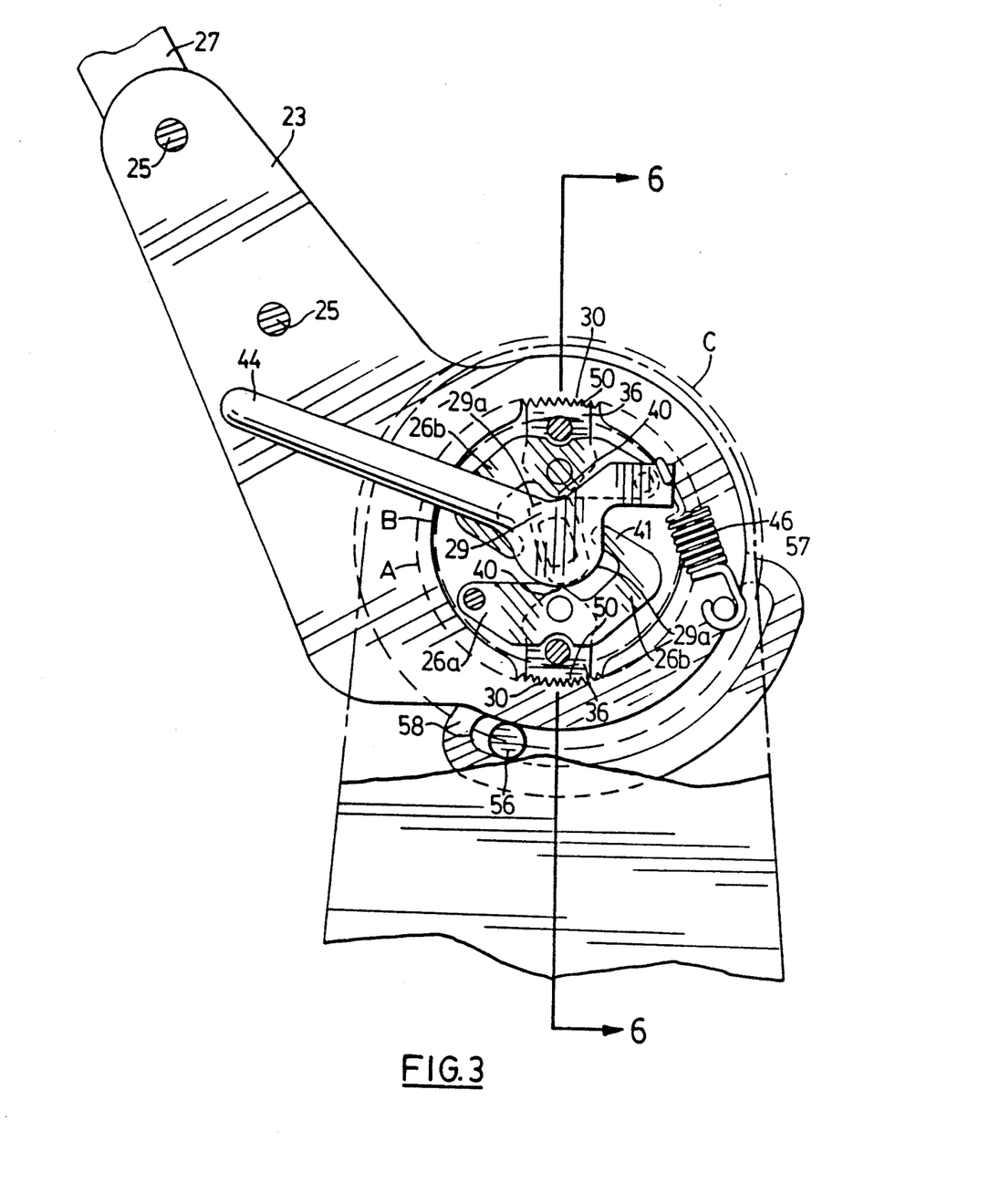
FIG. 3 is a side elevation, partly in section, illustrating the latching device of FIG. 2 in a latching configuration, with the backrest member of the seat assembly in an unfolded operative configuration suitable for carrying passengers.
Figure 4:
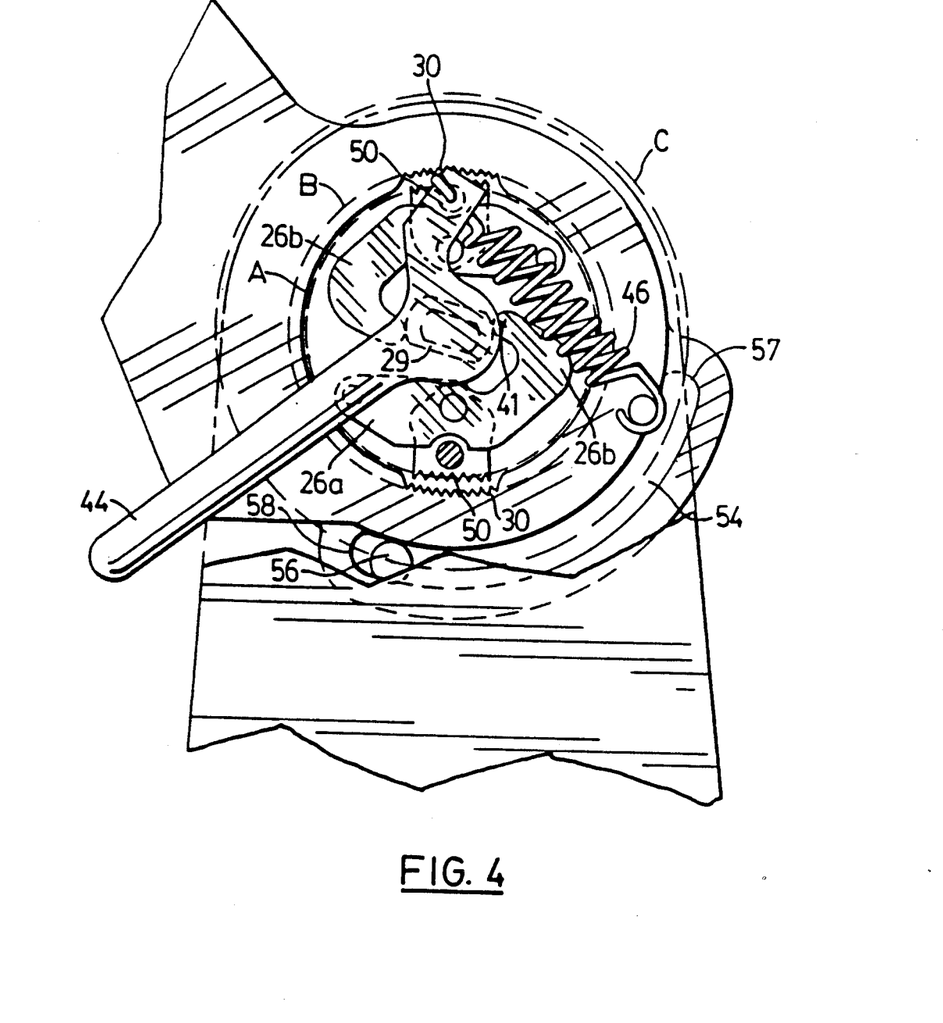
FIG. 4 is a view similar to FIG. 3, wherein the latching device is in an unlatching configuration.

A rotational control means, in the form of a lever member 44, is affixed in transverse relation to the outer end of the axle shaft 31 for effecting controlled rotation of the cam means 29 between a first and a second rotational orientation of the cam means, shown in FIGS. 3 and 4, respectively. The lever 44 has a cranked terminal end portion 45 which is adapted to receive a spring 46 interconnected between the terminal end portion 45 and a stud 47 positioned on the outer support plate 33 so as to bias the cam means 29 toward its first rotational orientation, as seen in FIG. 3.

In such first rotational orientation, each of the lobes 29a of the cam means 29 is in frictional engagement with the contact portion 40 of each pawl actuator member 26, so as to cause both pawl actuator members 26, 26 to simultaneously pivot to their respective first limit position (shown in FIG. 3), at which position each pawl means 36 lockingly engages the respective gear sector 30 by means of complimentary gear teeth 50, so as to restrain rotation of the hinge plate 23 relative to the inner 39 and outer 33 support plates, thereby restraining pivotal folding of the backrest member 14 relative to the seat-cushion member 16.

Figure 5:
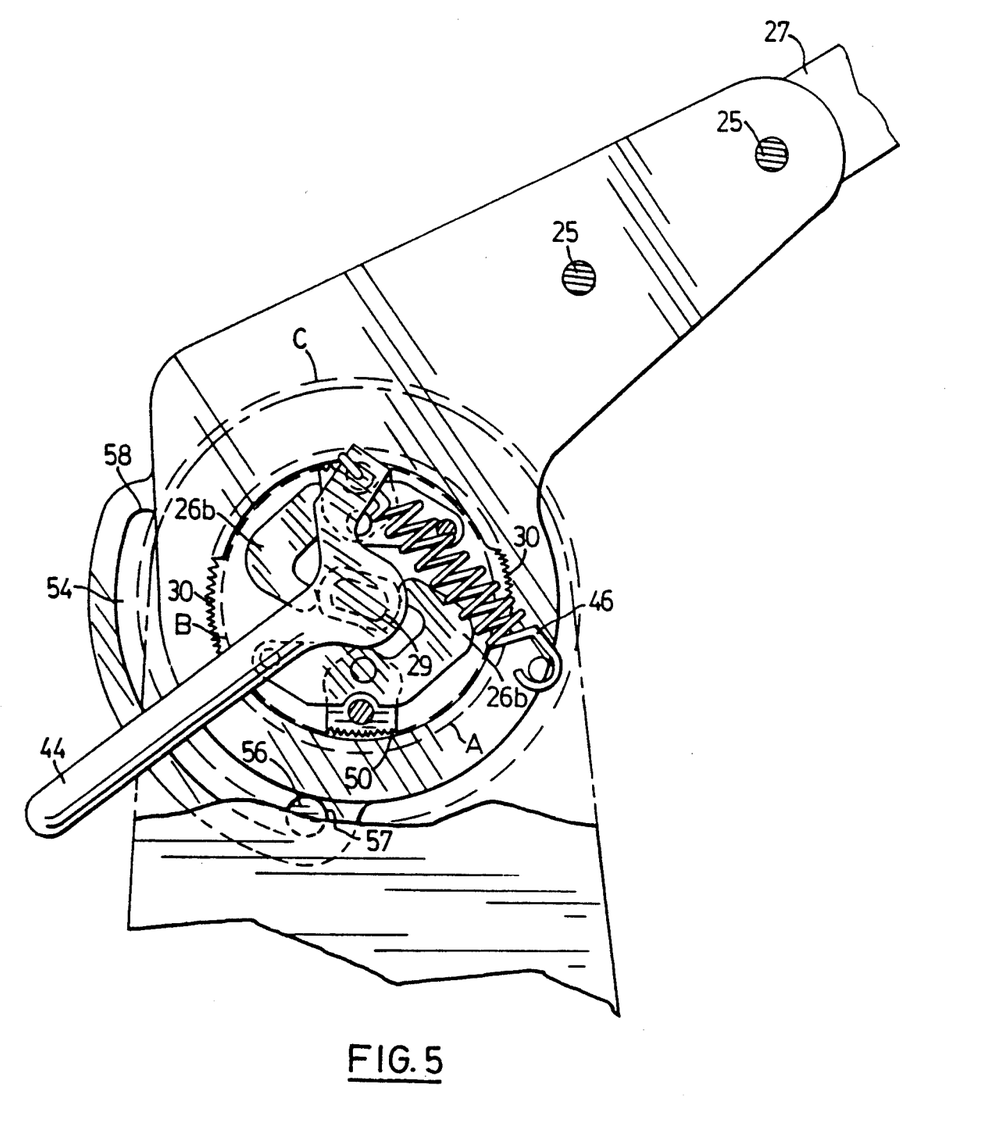
FIG. 5 is a view similar to FIGS. 3 and 4, wherein the latching device is in an unlatched configuration, and the backrest member of the seat assembly has been dumped to its forwardly-most folded operative position; and, FIG. 6 is a sectional view of the latching device of FIG. 3, taken along line 6—6 of FIG. 3.

When re-adjustment of the backrest member 14 to a new inclination angle is required by the occupant, the cam means 29 is rotated to its seCond rotational orientation (shown in FIG. 4) by counter-clockwise rotation of the lever member 44 against the tension of the spring means 46 by the seat occupant. In said second rotational orientation of the cam means 29, each of the lobes 29a of the cam means is in frictional engagement with the finger portion 41 the pawl actuator member 26 so as to cause both pawl actuator members 26, 26 to simultaneously pivot to their respective second limit position (shown in FIG. 4), at which position each pawl means 36 is disengaged from its respective gear sector 30, so as to allow for substantially unrestrained rotation of the hinge plate 23 relative to the inner 39 and outer 33 support plates, thereby allowing substantially free pivotal folding of the backrest member 14 relative to the seat-cushion 16. It will be appreciated that the pawl actuator members 26, 26 in this operation pivot inwardly sufficiently, under urging from the cam lobes 29a, 29a so that the pawl means 36 move inwardly toward th center of arc A a distance sufficient that the teeth 50 on each pawl means 36 clear the two generally smooth shoulder portions 52 formed on the hinge plate 23 between the opposed gear sectors 30, 30. This is, of course, essential to prevent jamming of the pawl means 36, 36 with such shoulders when the backrest member 14 is forwardly dumped to its forwardly-most folded operative position, as shown in FIG. 5. When the backrest member is in the forwardly-most folded operative position of FIG. 5, and the lever member 44 is thereafter released by the seat occupant, each pawl means 36, 36 slidingly engages an adjacent one of the shoulder portions 52, 52, so as to allow for rearward pivotal folding of the backrest member 14 relative to the seat-cushion member 16 until such time as both pawl means 36, 36 become aligned with a respective opposed gear sector 30, at which alignment each respective pawl means 36 moves from sliding engagement with its respective shoulder portion 52 into locking engagement with a respective gear sector 30 under the aforementioned biasing of the cam means 29 by the spring means 46 towards said first rotational orientation of the cam means 29. In this manner, the rotation of the hinge plate 23 relative to the inner 39 and outer 33 support plates is automatically restrained when the hinge plate 23 is rearwardly folded into the range of operative upright configurations of the backrest member 14. It will be appreciated that the angular range of upright backrest adjustment positions is defined by the circumferential length of each of the gear sectors 30, and it will be further appreciated, that precise adjustment of the inclination angle of the backrest member 14 to a particular seat occupant's requirements can be accommodated within this range of adjustment by disengagement of the pawl members 36 from the gear sectors 30 in the manner previously described, followed by moderate forward or rearward pivotal folding of the backrest member 14 by the seat occupant within the design range. If the occupant goes beyond the defined range of adjustment while holding the handle member 44 in the released configuration shown in FIG. 4, the pawl means 36 will again, after release of the handle member 44, ride upon the shoulder portions 52 until such time as the backrest member 14 is folded into the adjustment range, whereupon the pawl means 36, 36 will each again lockingly engage their respective gear sectors 30, 30 so as to once again secure the backrest member 14 in an upright operative configuration.

It will be appreciated from the drawings that the two generally smooth shoulder portions 52, 52 together define a second inturned arc, generally designated by the reference letter B, which second inturned arc B is of lesser diameter than the first inturned arc A, and the notional axis of which second inturned arc B is coincident with the pivot axis of the backrest member 14 and the seat-cushion member 16 and with the notional axis of the first inturned arc A.

In order to define and limit the forward and rearward extremes of pivotal folding of the backrest member 14, the hinge plate 23 is preferably formed with a slotted track portion 54 adjacent a lower edge of the plate 23 which slotted track portion 54 defines a third arc, generally designated by the reference letter C, whose axis is also coincident with the pivot axis and the first and second arcs previously defined. A limit pin 56 (see FIG. 5) is rigidly affixed to the inner support plate 39 so as to axially protrude into the slotted channel 54, such that the two circumferential ends 57, 58 of the slotted channel 54 together define the respective folded (i.e. forwardly dumped—see FIG. 5) and unfolded (i.e. rearwardly dumped—not shown) limit positions of the backrest member 14.

It is also preferable, as shown by the sight line 6—6 running through the center of FIG. 3, that the opposed gear sectors 30, 30 be off-set from such center line by one-half of one cycle. That is, that the crests of one gear sector 30 be aligned with the valleys of the opposed opposite gear sector 30 so as to maximize the probability of immediate engagement between a pawl means 36 and the respective gear sector 30 when the pawl means 36 slides from engagement with the engaged shoulder portion 52 into engagement with the gear sector 30. In this regard, the pair of rivets 42 and 43 are arranged so as to allow a controlled amount of rotation of the pawl means 36 relative to the pawl actuator members 26, thereby to allow a limited amount of play in the device to accommodate aligned engagement between the teeth 50 of the pawl means 36 and actuator members 26.

It will be appreciated that movement of the hinge plate 23 and the associated backrest member 14 from the orientation shown in FIG. 4 to that shown in FIG. 5 may be under manual urging by the seat occupant or may be by reason of a return spring (not shown) interconnected between the hinge plate 23 and the seat member 16 in any conventional manner.

It will be understood that numerous variations as will occur to those skilled in the art may be made to the above described embodiment of the invention without departing from the claimed scope of the invention. Such variations will include providing the gear means on the seat-cushion member 16 and the pawl actuator members and pawl means on the backrest member 14. It will also be obvious to reduce or increase the number of pawl actuator members and associated pawl means and to replace the spring means illustrated with miniature gas cylinders, as is becoming increasingly common in the automotive industry. It will also be understood that the rotational control means for selectively rotating the cam means may vary considerably and could, for example, be power driven. It will also be apparent to incorporate a different form of coupling means between the backrest member and the seat-cushion member, so as to eliminate the meeting channels 48 and 49, although the arrangement shown is preferred for its simplicity, strength, and compactness.

I claim:

1. A latching device for use with a vehicle seat assembly having a first and a second seat member pivotally foldable relative to one another about a pivot axis between a folded and an unfolded operative position, the device comprising:

a gear means comprising two circumferentially spaced gear sectors rigidly affixed to the first seat member so as to together define a first inturned arc whose notional axis is generally parallel to said pivot axis;

a cam means journaled for rotation in the second seat member about a rotational axis arranged in generally parallel relation to said pivot axis and within said first inturned arc;

two substantially congruent pawl actuator members each having first and second end portions, each pawl actuator member being pivotally mounted adjacent its first end portion on the second seat member, internal to said first inturned arc;

each of the pawl actuator members being adapted to interact with the cam means upon controlled rotation of the cam means to selectively and simultaneously pivot the pawl actuator members between first and second limit positions;

a rotational control means affixed to the cam means for effecting said controlled rotation thereof between a first and a second rotational orientation;

a pawl means mounted on each pawl actuator member intermediate the respective first and second end portions of said pawl actuator member for movement therewith;

whereby rotation of the cam means to the first rotational orientation causes the pawl actuator members to simultaneously pivot to their respective first limit positions whereat each respective pawl means lockingly engages a respective gear sector so as to restrain said pivotal folding of the first member relative to the second member; and, whereby rotation of the cam means to the second rotational orientation causes the pawl actuator members to simultaneously pivot to their respective said second limit positions, whereat the pawl means are disengaged from the respective gear sectors, so as to allow for pivotal folding of the first seat member relative to the second seat member.

2. The device according to claim 1, wherein said rotational control means includes spring means for biasing the cam means towards said first rotational orientation.

3. The device according to claim 2, wherein the notional axis of said first defined arc is coincident with the rotational axis of the cam means.

4. The device according to claim 3, wherein the notional axis of the said first defined arc is coincident with said pivot axis of the first and second seat members.

5. The device according to claim 4, wherein the rotational control means comprises a handle means rigidly affixed to the cam means in generally transverse orientation thereto.

6. The device of calim 5, wherein the gear means is rigidly affixed to a hinge plate which hinge plate is in turn rigidly affixed to the backrest member, and wherein said hinge plate presents two arcuate, generally smooth shoulder portions, which shoulder portions together define a second inturned arc of lesser diameter than said first inturned arc, the notional axis of which second inturned arc is coincident with the notional axis of said first inturned arc;

whereby release of the handle means by the operator, when the cam means is in its second rotational orientation, causes each pawl means to slidingly engage a respective one of said shoulder portions, thereby to allow for pivotal folding of the backrest member relative to the seat-cushion member until such time as the pawl means are aligned with a respective gear sector, at which alignment each respective pawl means lockingly engages a respective gear sector under said biasing of the cam means by the spring means towards said first rotational orientation.

7. The device of claim 6, wherein the first seat member is a backrest member and the second seat member is a seat cushion member.

8. The device according to claim 7, wherein the gear means is rigidly affixed to the backrest member by means of a hinge plate having a slotted channel formed thereon, which slotted channel defines a third arc whose axis is coincident with said pivot axis, and, wherein a limit pin is rigidly affixed to the seat cushion member so as to axially project into said slotted channel, such that the two circumferential ends of the slotted channel together define said folded and unfolded limit positions of the backrest member and seat-cushion member upon said relative pivotal folding thereof.

9. The device according to claim 8, wherein an annular, generally concave channel is formed in said hinge plate in circumscribing relation to the gear means, and wherein a complementary, annular generally convex ridge is provided on the seat-cushion member in aligned mating relation with said generally concave channel, thereby to together define a coupling means between said backrest and said seat-cushion members, which coupling means provides for said pivotal folding of the backrest and seat-cushion members relative to one another and defines said pivot axis of said pivotal folding.

10. In a vehicle having a seat assembly including a first and second seat member pivotally foldable relative to one another about a pivot axis between a folded and an unfolded operative position and a latching device for releasably holding said seat members in said positions, the latching device comprising:

a gear means comprising two circumferentially spaced gear sectors rigidly affixed to one of said seat members so as to together define an first inturned arc whose notional axis is generally parallel to said pivot axis;

a cam means journaled for rotation in the other of said seat members about a rotational axis arranged in generally parallel relation to said pivot axis and within said first inturned arc;

two substantially congruent pawl actuator members each having first and second end portions, each pawl actuator member being pivotally mounted adjacent its first end portion on the other of said seat members, internal to said first inturned arc;

each of the pawl actuator members being adapted to interact with the cam means upon controlled rotation of the cam means to selectively and simultaneously pivot the pawl actuator members between first and second limit positions;

a rotational control means affixed to the cam means for effecting said controlled rotation thereof between a first and a second rotational orientation., a pawl means mounted on-.each pawl actuator member intermediate the respective first and second end portions of said pawl actuator member for movement therewith;

whereby rotation of the cam means to the first rotational orientation causes the pawl actuator members to simultaneously pivot to their respective first limit positions whereat each respective pawl means lockingly engages a respective one of said gear sectors so as to restrain said pivotal folding of the first member relative to the second member; and, whereby rotation of the cam means to the second rotational orientation causes the pawl actuator members to simultaneously move to their respective said second limit positions, whereat the pawl means are each disengaged from the said respective one of the gear sectors, so as to allow for pivotal folding of the one seat member relative to the other seat member.

* * * * *